US006067498A

United States Patent [19]

Akiyama

[11] Patent Number: 6,067,498

[45] Date of Patent: May 23, 2000

[54] METHOD AND APPARATUS FOR ENGINE ABNORMALITY DETECTION

[75] Inventor: Sadachika Akiyama, Yuuki, Japan

[73] Assignee: Komatsu Ltd., Tokyo, Japan

[21] Appl. No.: 09/189,522

[22] Filed: Nov. 10, 1998

[30] Foreign Application Priority Data

Nov. 13, 1997 [JP] Japan .................................... 9-331310

[51] Int. Cl.[7] ............................ F01B 25/00; F01B 25/26; G01M 3/00; G01M 15/00

[52] U.S. Cl. ............................ 701/110; 73/115; 73/117.3; 701/101; 701/104

[58] Field of Search .................................... 701/110, 111, 701/101, 102, 104; 73/116, 117.2, 117.3, 118.1, 118.2, 119 A, 47, 49.7, 115

[56] References Cited

U.S. PATENT DOCUMENTS

| | | | |
|---|---|---|---|
| 4,375,672 | 3/1983 | Kato et al. | 73/117.2 |
| 4,633,707 | 1/1987 | Haddox | 73/47 |
| 4,667,507 | 5/1987 | Eriksson | 73/49.7 |
| 4,679,424 | 7/1987 | Tubman | 73/49.7 |
| 4,719,792 | 1/1988 | Eriksson | 73/47 |
| 4,945,759 | 8/1990 | Krofchalk et al. | 73/117.3 |
| 5,056,026 | 10/1991 | Mitchell et al. | 73/117.3 |
| 5,365,773 | 11/1994 | Graze, Jr. et al. | 73/47 |
| 5,463,567 | 10/1995 | Boen et al. | 364/551.01 |
| 5,569,841 | 10/1996 | Hoban et al. | 73/47 |
| 5,585,549 | 12/1996 | Brevick et al. | 73/49.7 |
| 5,633,459 | 5/1997 | Rodriguez | 73/49.7 |

*Primary Examiner*—George Dombroske
*Attorney, Agent, or Firm*—Sidley & Austin

[57] ABSTRACT

In engine abnormality detection, the engine output is measured, and values of a specific operating variable of the fuel system, the lubrication system, the cooling system, the intake system, or the exhaust system of the engine, are measured and the specific values are converted to corrected data values at the equivalent rated power point, which are compared to corresponding threshold values in order to detect an abnormality in the respective system. The apparatus includes detection sensors (33–38) for detecting values of specific operating variables; an engine rotational speed sensor (31); a fuel injection volume sensor (32); storing means (45*a*), for storing in memory the values of the engine rotational speed and the volume of injected fuel at the rated power point; specific data selection means (45*b*, 45*d*), for storing in memory the rotational speed value and the fuel injection volume value for a point in time within a first period of time, for measuring the value of the specific operating variable at that point in time, and for selecting the largest value from among the measured values of the specific operating variable; specific data conversion means (45*c*, 45*e*), for converting the largest value to a corrected value at the equivalent rated power point of the engine, and for storing the results in memory; and alarm output means (46), for issuing an alarm if the corrected value is larger than a corresponding threshold value.

18 Claims, 7 Drawing Sheets

METHOD AND APPARATUS FOR ENGINE ABNORMALITY DETECTION

TECHNICAL FIELD

The present invention relates to a method and an apparatus for measuring values of specific operating variables of the engine systems, including the fuel system, the lubrication system, the cooling system, the intake system, and the exhaust system, and for detecting an abnormality in the relevant system.

BACKGROUND ART

Heretofore, a diesel engine (hereafter referred to as "engine") has been equipped with an apparatus, such as a turbocharger or a mechanical turbocharger, which increases the volume of intake air and expands the exhaust gas output. A pneumatic governor is used which can control the volume of fuel supplied to the engine by the pressure supplied by the volume of intake air, which can prevent the engine from stopping, and which can control a maximum rotational speed. Furthermore, the temperature of the engine exhaust gas is measured, that exhaust gas temperature is compared to a corresponding threshold value, and the presence or absence of one of the following abnormalities in the engine is detected:

(1) an open/close abnormality of valves such that the exhaust gas from the exhaust process flows from the intake valve to the intake side;

(2) a breakdown of the turbocharger such that the temperature of the exhaust gas rises; or (3) a breakdown of fuel injection devices such that the volume of injected fuel increases and the temperature of the exhaust gas rises.

Periodically, or when an abnormality is thought to have occurred, the operator measures the pressure of the blowby gas in the engine to detect an abnormality such as wear of the pistons or the piston rings. In the same way, the pressure and temperature of the engine lubrication oil are measured, and the presence or absence of an abnormality in a pump, a valve, a pressure regulator, or another component is detected; or the air intake pressure is measured and the presence or absence of clogged filters is detected.

Simply measuring a specific operating variable (for example, the exhaust gas temperature) of the engine systems, such as the fuel system, the lubrication system, the cooling system, the intake system, and the exhaust system, and comparing the value of the specific operating variable with a corresponding threshold value can result in the detection of an abnormality when the value of the specific operating variable clearly surpasses the corresponding threshold value. However, if the value of the specific operating variable is near to and lower than the corresponding threshold value, an erroneous judgment that no abnormality is present may occur, resulting in damage to the engine. Setting the corresponding threshold value slightly low, to be on the safe side, causes a problem in that an abnormality judgment can be made even when there is no abnormality, resulting in needless inspections being conducted and wasted man hours.

Furthermore, if the specific operating variables are to be measured at certain intervals, even when no load is applied and hence breakdowns are unlikely to occur, or at low rotational speeds, and the values of the specific operating variables are corrected and compared with the corresponding threshold values, a computer with a large storage capacity is required, and costs rise. If multiple computers are used, a problem arises in that the control becomes complex and the control speed is slower.

Moreover, even if the operator measures the values of the specific operating variables of the engine (for example, the blowby gas pressure) at periodic intervals, or when an abnormality is thought to have occurred, a problem results in that while the circumstances at that particular time can be judged, it is not possible to ascertain kinetic changes which take place over time, e.g., in the wear of the pistons or the piston rings, because changes which take place with the passage of time are not being measured; thus, an accurate judgment cannot be made. Furthermore, a problem results in that, because conditions, such as the engine output, are not consistent when the specific operating variable is measured, it is impossible to make an accurate judgment.

SUMMARY OF THE INVENTION

The present invention, which has been developed with the intention of solving the above problems, provides an engine abnormality detection apparatus and an abnormality detection method by which the engine output is measured; the values of specific operating variables of the fuel system, the lubrication system, the cooling system, the intake system, or the exhaust system of the engine are measured; the values of specific operating variables are converted to corrected data at the equivalent rated power point; and the corrected data are compared to the corresponding threshold values; in order to detect an abnormality comprehensively, rapidly, and efficiently.

In a first aspect of the invention, the apparatus is an engine abnormality detection apparatus in which values of a specific operating variable of the fuel system, the lubrication system, the cooling system, the intake system, or the exhaust system of the engine, are measured to detect an abnormality in the respective system. The engine abnormality detection apparatus comprises a specific operating variable detecting sensor that measures the specific operating variable; an engine rotational speed sensor, that measures the engine rotational speed; a fuel injection volume sensor, that measures the volume of injected fuel; a storage means (memory), that records the values of the engine rotational speed and the volume of injected fuel, each at the equivalent rated power point; a storage and selection means that records, within a first predetermined period of time, the value of the rotational speed signal from the engine rotational speed sensor and the value of the fuel injection volume signal from the fuel injection volume sensor, that measures the values of the specific operating variables at that time using the detecting sensors for the specific operating variables, and that selects the largest value from the measured values of a specific operating variable; and a conversion means that calibrates the selected largest measured value of the specific operating variable with respect to the engine rotational speed and the fuel injection volume at the equivalent rated power point in order to establish a corrected specific data value, and records the corrected specific data value.

By means of the above configuration, the values of the rotational speed and the fuel injection volume at the equivalent rated power point of the engine are stored in memory; and the engine rotational speed, the volume of injected fuel, and the specific operating variable are measured at a first point in time, and these measured values are stored in memory. Next, the engine rotational speed, the volume of injected fuel, and the specific operating variable are measured at a second point in time. Along with the storing in memory of the values of the rotational speed and the volume of injected fuel which are measured at the second point in time, the values of the specific operating variable from the first and second points in time are compared; and the larger measured value of these specific operating variable values is stored in memory along with the values of the rotational speed and the fuel injection volume which were measured at the point in time corresponding to the larger measured value. The smaller measured value of the specific operating variable can be deleted at this point. These first, second, etc., measurements are carried out at a plurality of points in time during a first predetermined period of time, and the largest measured value of the specific operating variable is selected and stored in memory. Next, the largest measured value of the specific operating variable is corrected so as to become a corrected specific data value for the specific operating variable at the rotational speed and the fuel injection volume at the equivalent rated power point, and the thus corrected specific data value is stored in memory. If one of these corrected specific data values is higher than the corresponding threshold value, a judgment is made that there is an abnormality in the system corresponding to the specific operating variable from which that corrected specific data value was obtained, and an alarm is outputted.

Consequently, after the values of the specific operating variables of the engine have been measured and corrected to corresponding corrected specific data values under constantly identical conditions, the corrected specific data values are compared with the corresponding threshold values, thereby enabling a stable comparison and permitting the corresponding threshold values to be set to numerical values which are close to those in effect at the time when an abnormality occurs. This results in high accuracy in engine abnormality detection, and eliminates the possibility of damage to the engine through an incorrect judgment, as well as eliminating unnecessary inspections and wasted man hours.

In a second aspect of the invention, the storage and selection means, along with establishing the corrected specific data value at the equivalent rated power point from the largest measured value of a specific operating variable within the first predetermined period of time, carries out this sequence repeatedly for a second predetermined period of time, selects the largest corrected specific data value, stores the largest corrected specific data value in memory, and deletes corrected specific data values other than the largest corrected specific data value.

By means of the above configuration, a first corrected specific data value is obtained by selecting the largest measured value of a specific operating variable during the first predetermined period of time and converting the selected measured value to corrected data at the equivalent rated power point of the engine. A second corrected specific data at the equivalent rated power point of the engine is obtained in the same way from the largest measured value of the specific operating variable during a second predetermined period of time. The corrected specific data value calculated from one period of time and the corrected specific data value calculated from the next period of time are compared, and the larger one of these corrected specific data values is stored in memory, and the process is sequentially repeated. In this way, the largest corrected specific data value and the corresponding values of the rotational speed and the fuel injection volume within the first and second predetermined periods of time are stored in memory. If a larger corrected specific data value is determined during the next predetermined period of time, that larger corrected specific data value is stored in memory, and other corrected specific data are deleted from memory.

Consequently, because a computer with a small memory capacity can be used, the computer can be used efficiently, enabling the reserve power to be used for other purposes.

In a third aspect of the invention, which derives from the first aspect or the second aspect, an alarm output means is provided, by which an alarm is outputted in the event that either the corrected specific data value at the equivalent rated power point or the largest corrected specific data value from among the corrected specific data values is higher than a corresponding threshold value.

As the above configuration does not output an alarm for the measured data, but outputs an alarm in the event that either the corrected specific data value at the equivalent rated power point or the largest corrected specific data value is higher than the corresponding threshold value, it is possible to obtain information with a higher level of precision. Consequently, breakdowns can be detected earlier and significant problems can be discovered at an early stage.

In a fourth aspect of the invention, the abnormality detection apparatus measures the exhaust gas temperature to detect an abnormality in the engine fuel system, in the intake system, or in the exhaust system, or in an engine system, and the apparatus comprises: an exhaust gas temperature sensor, that measures the temperature of the engine exhaust gas; an engine rotational speed sensor, that measures the rotational speed of the engine; a fuel injection volume sensor, that measures the volume of injected fuel; and a storing means, by which the values of the engine rotational speed and the volume of injected fuel at the equivalent rated power point are stored in memory; a storing and selecting means, that stores in memory the value of the rotational speed, from the engine rotational speed sensor, and the value of the volume of injected fuel, from the fuel injection volume sensor, at a plurality of points in time within a first predetermined period of time, that measures the engine exhaust gas temperature value at each point in time, and that selects the highest measured exhaust gas temperature value from among those stored in memory; means for correcting the highest exhaust gas temperature value to a corrected exhaust gas temperature value representing the exhaust gas temperature value for the values of the engine rotational speed and the fuel injection volume at the equivalent rated power point, and for storing the corrected exhaust gas temperature value in memory; and alarm means for outputting an alarm in the event that the corrected exhaust gas temperature value for the equivalent rated power point is higher than a corresponding threshold value.

By means of the above configuration, along with the values of the rotational speed and the volume of injected fuel at the equivalent rated power point of the engine being stored in memory, the engine rotational speed, the volume of injected fuel, and the temperature of the exhaust gas are measured at a first point in time. Along with the first values of the rotational speed and the volume of injected fuel being stored in memory, the value of the exhaust gas temperature is also stored in memory. Next, the engine rotational speed, the volume of injected fuel, and the temperature of the exhaust gas are measured at a second point in time. Along with the second values of the rotational speed and the volume of injected fuel being stored in memory, the value of the exhaust gas temperature from the second point in time is compared to the value of the exhaust gas temperature from the first point in time, and the higher exhaust gas temperature is stored in memory. At that point in time, the lower exhaust gas temperature value is deleted from memory. These measurements are carried out continuously at a plurality of points in time during a first predetermined period of time, and the highest measured exhaust gas temperature value is selected and stored in memory. Next, this highest measured exhaust gas temperature value is corrected, based on the rotational speed and output torque measured at the corresponding point in time, so that it becomes the corrected exhaust gas temperature value for the values of the rotational speed and volume of injected fuel at the equivalent rated power point, and is stored in memory. If this second corrected exhaust gas temperature value is higher than the corresponding threshold value, an abnormality is judged to have occurred in the intake and exhaust systems, and an alarm is outputted.

Consequently, after the exhaust gas temperature of the engine is measured and the corrected exhaust gas temperature values are calculated continuously under consistent conditions, the corrected exhaust gas temperature values can be compared to the corresponding threshold value, enabling a stable comparison and the setting of the corresponding threshold values to be numerical values which are close to those in effect at the time when an abnormality occurs. This results in improved precision in engine abnormality detection, and eliminates the possibility of damage to the engine through an incorrect judgment, as well as eliminating unnecessary inspections and wasted man hours.

In a fifth aspect of the invention, which derives from the fourth aspect, the abnormality detection apparatus includes: an atmospheric pressure sensor, that detects the pressure of the atmosphere; an atmospheric temperature sensor, that detects the temperature of the atmosphere; means of storing data in memory, by which values of the engine rotational speed and the volume of injected fuel, each at the equivalent rated power point at an atmospheric pressure of 760 mmHg and an atmospheric temperature of 25° C., are stored in memory; atmospheric conversion means, by which the corrected exhaust gas temperature value is converted to a further corrected exhaust gas temperature value for the equivalent rated power point, an atmospheric pressure of 760 mmHg, and an atmospheric temperature of 25° C.; and an alarm means for issuing an alarm if this further corrected exhaust gas temperature value is higher than the corresponding threshold value.

By means of the above configuration, along with storing in memory the value of the output torque at an atmospheric pressure of 760 mmHg, an atmospheric temperature of 25° C., and the equivalent rated power point, the engine exhaust gas temperature, the engine rotational speed, and the volume of injected fuel are measured. Along with determining the output torque for the engine from the measured values of the engine rotational speed and the volume of injected fuel, the exhaust gas temperature value measured at that point in time is corrected to become the corrected exhaust gas temperature value for the values of the rotational speed and the volume of injected fuel at the equivalent rated power point at an atmospheric pressure of 760 mmHg and an atmospheric temperature of 25° C. If this corrected exhaust gas temperature is higher than the corresponding threshold value, an abnormality is judged to have occurred in the intake and exhaust systems, and an alarm is issued.

Because the temperature of the exhaust gas changes in response to changes in the atmospheric pressure and the atmospheric temperature, the measured exhaust gas temperature value is corrected to match the specified atmospheric conditions. This corrected exhaust gas temperature value is compared to the corresponding threshold value, and a decision is made regarding the presence or absence of an abnormality, enabling detection of the abnormality with a still higher degree of accuracy. Consequently, there is no possibility of an erroneous decision being made, causing damage to the engine and wasting man hours on unnecessary inspection.

In a sixth aspect of the invention, the abnormality detection apparatus measures the pressure of the blowby gas in the engine and determines the presence or absence of an abnormality in an engine piston, a piston ring, or another component, and comprises: blowby gas pressure selection means, by which the pressure of the blowby gas in the engine is measured and the highest measured blowby gas pressure value is selected from among those values measured within a first predetermined period of time; and an alarm means, by which an alarm is outputted if the highest blowby gas pressure value is higher than the corresponding threshold value.

With the configuration of the sixth aspect of the invention, the blowby gas pressure of the engine is detected at uniform time intervals within a first predetermined period of time, and the highest blowby gas pressure value from among those values detected within the first predetermined period of time is selected. If this highest blowby gas pressure value is higher than the corresponding threshold value, an alarm is outputted.

As the blowby gas pressure of the engine is detected at uniform time intervals, and the highest blowby gas pressure value from among those values detected is selected and compared to the corresponding threshold value, data can be obtained over a long detection time. As the highest measured blowby gas pressure value is used for comparison, the comparison can be made precisely and at a high level of stability, based on reliable data. This results in a high degree of accuracy in engine abnormality detection, so that there is no possibility of an erroneous decision being made which would cause damage to the engine and waste man hours on unnecessary inspection.

In a seventh aspect of the invention, which derives from the fourth aspect or the sixth aspect of the invention, either a means for selecting the highest exhaust gas temperature value stores in memory the highest measured value from the measurements of the exhaust gas temperature taken at uniform time intervals, or a means for selecting the highest blowby gas pressure value stores in memory the highest measured value from the measurements of the blowby gas pressure taken at uniform time intervals.

By means of the above configuration, data measured at uniform time intervals are compared, and the data with the largest numeric value from all of the measurements is retained in the memory, while data with smaller numeric values are deleted from the memory, so that only the highest data value for a predetermined period of time is retained in memory.

In this way, e.g., because the highest exhaust gas temperature value is selected and lower exhaust gas temperature values are deleted, a computer with a small memory capacity can be used. Consequently, the computer can be used efficiently, enabling the reserve power to be used for other control purposes.

In an eighth aspect of the invention, which derives from the sixth aspect of the invention, the apparatus includes: a blowby gas pressure sensor, that detects the pressure of blowby gas in the engine; an engine rotational speed sensor, that detects the engine rotational speed; a fuel injection volume sensor, that detects the volume of injected fuel; storing means, by which values of the engine rotational speed and the volume of injected fuel at the equivalent rated power point are stored in memory; blowby gas pressure conversion means, by which the highest measured blowby gas pressure value is corrected to become a corrected blowby gas pressure value at the values of the engine rotational speed and the volume of injected fuel at the equivalent rated power point, and is stored in memory; and alarm means, by which an alarm is outputted if the corrected blowby gas pressure value at the equivalent rated power point is higher than the corresponding threshold value.

By means of the above configuration, along with storing in memory values of the engine rotational speed and the volume of injected fuel at the equivalent rated power point, the engine rotational speed, the volume of injected fuel, and the blowby gas pressure are measured at a first point in time. Along with determining the output torque of the engine from the measured values of the engine rotational speed and the fuel injection volume, the first measured value of the blowby gas pressure is stored in memory. Next, the engine rotational speed, the volume of injected fuel, and the blowby gas pressure are measured at a second point in time. Along with determining the output torque of the engine from the measured values of the engine rotational speed and the fuel injection volume from the second measurement, the second measured blowby gas pressure value is compared to the first measured blowby gas pressure value, and the higher measured blowby gas pressure value is stored in memory. At this point, the smaller blowby gas pressure value is deleted from the memory. These measurements are carried out continuously for a plurality of points in time during a first predetermined period of time, with the highest measured blowby gas pressure value being selected and stored in memory. Next, this highest measured blowby gas pressure value is corrected, based on the rotational speed and output torque measured at that point in time, to become the corrected blowby gas pressure for the values of the rotational speed and the volume of injected fuel at the equivalent rated power point. If the corrected blowby gas pressure value is higher than the corresponding threshold value, an abnormality is judged to have occurred in the intake and exhaust systems, and an alarm is outputted.

Consequently, the blowby gas pressure of the engine is measured, the measured values are corrected continuously under consistent conditions, and the corrected blowby gas pressure value is compared to the corresponding threshold value, enabling a stable comparison and the setting of the corresponding threshold values to numerical values which are close to those in effect at the time when an abnormality occurs. This results in a high degree of accuracy in engine abnormality detection, and eliminates the possibility of damage to the engine through an incorrect judgment, as well as eliminating unnecessary inspections and wasted man hours.

In a ninth aspect of the invention, relating to an engine abnormality detection method that measures the temperature of the engine exhaust gas and detects an abnormality in the engine fuel system, the intake system, the exhaust system, or another engine system, the method comprises: storing in memory values of the engine rotational speed and the volume of injected fuel at each of a plurality of points in time within a first predetermined period of time; measuring the temperature of the engine exhaust gas at each point in time; selecting the highest measured exhaust gas temperature value from among the exhaust gas temperature values measured within the first predetermined period of time; correcting this highest exhaust gas temperature value to a corrected exhaust gas temperature value at the equivalent rated power point; and, if this corrected exhaust gas temperature value at the equivalent rated power point is higher than the corresponding threshold value, outputting an alarm.

Actions and effects similar to those of the engine abnormality detection apparatus of the fourth aspect of invention can be obtained with a method in accordance with the ninth aspect of the invention.

In a tenth aspect of the invention, relating to an engine abnormality detection method that measures the blowby gas pressure of the engine to detect an abnormality in engine pistons, piston rings, or other components, the method comprises: storing in memory values of the engine rotational speed and the volume of injected fuel; measuring the blowby gas pressure of the engine; selecting the highest measured blowby gas pressure value from among those measured within a first predetermined period of time; and, if this highest measured blowby gas pressure value is higher than the corresponding threshold value, outputting an alarm.

Action and effects similar to those of the engine abnormality detection apparatus of the sixth aspect of the invention can be obtained with a method in accordance with the tenth aspect of the invention.

BEST MODE FOR CARRYING OUT THE INVENTION

Some embodiments of an engine abnormality detection apparatus and an abnormality detection method relating to the present invention will be described with reference to the drawings.

Figure 1:
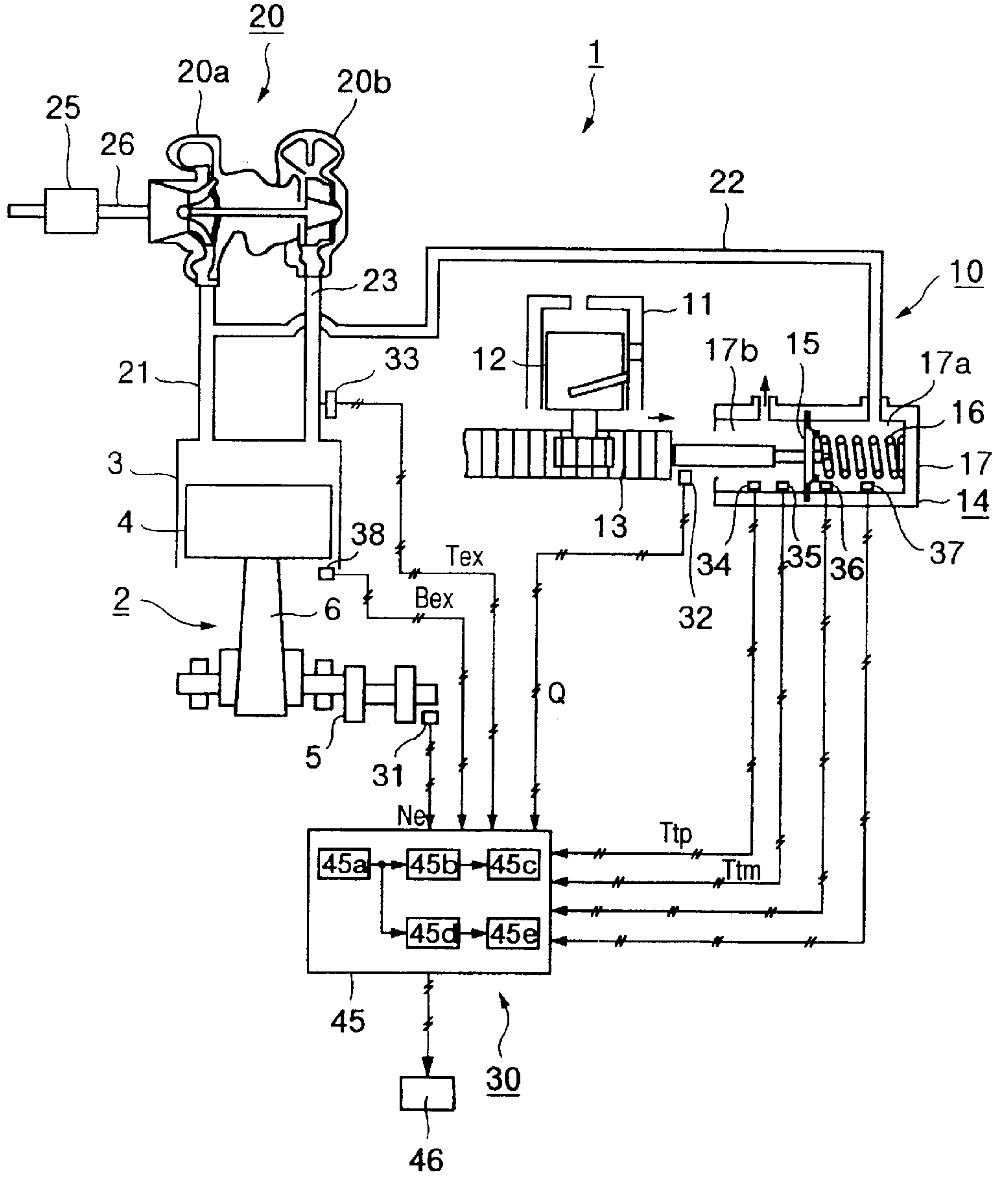
FIG. 1 is an overall structural view of an abnormality detection apparatus that detects an abnormality in the exhaust gas temperature and the blowby gas pressure in a turbocharged engine in accordance with the present invention.

FIG. 1 shows the overall structure of an abnormality detection apparatus 30 that detects an abnormality of the exhaust gas temperature or the blowby gas pressure in a turbocharged engine 1 in accordance with the present invention. The turbocharged engine 1 (hereafter referred to as the "engine 1") comprises an engine body 2; a fuel injection apparatus 10; a turbocharging apparatus 20, such as a turbocharger; an air cleaner 25; and an abnormality detection apparatus 30 that detects abnormalities of the exhaust gas temperature or the blowby gas pressure.

A piston 4 in the engine body 2 is inserted by means of autonomous sliding in a cylinder provided in the crankcase 3, with the piston 4 being coupled to a crankshaft 5 via a rod 6.

The fuel injection apparatus 10 comprises an injection pump 11, which is supplied with fuel from a fuel pump (not shown) and which discharges the fuel into the cylinder; a rack 13, which meshes with a plunger 12 in the injection pump 11; and a governor 14, which is connected to the rack 13 and which increases or decreases the amount of fuel supplied. The governor 14 comprises a diaphragm 15, which is connected to the rack 13; a spring 16, which compresses the diaphragm 15; and a governor case 17, which retains the diaphragm 15 and also houses the spring 16. One end 17*a* of the governor case 17 houses the spring 16 and is connected via a governor pipe 22 to an intake pipe 21, which will be described infra. The end 17*b* of the governor case 17, which is opposite to the end 17*a* that houses the spring 16, is open to the exterior of the apparatus.

The turbocharging apparatus 20, such as a turbocharger, comprises a blower 20*a* and a turbine 20*b*, with the blower 20*a* being connected to the engine cylinder via an intake pipe 21 and an intake valve (not shown), and the turbine 20*b* being connected to the cylinder via an exhaust pipe 23 and an exhaust valve (not shown).

An air cleaner pipe 26, containing an air cleaner 25, is connected to the blower 20*a* of the turbocharger 20. The turbine 20*b* is connected to the exhaust pipe (not shown) which discharges to the exterior of the apparatus.

The abnormality detection apparatus 30, which detects an abnormality of the exhaust gas temperature and the blowby gas pressure, comprises: an engine rotational speed sensor 31; a fuel injection volume sensor 32; an exhaust gas temperature sensor 33; an atmospheric pressure sensor 34; an atmospheric temperature sensor 35; a blowby gas pressure sensor 38; and a control unit 45 to which these various sensors are connected. When deemed necessary, other components, such as an intake pressure sensor 36 and a fuel supply pressure sensor 37, can also be provided.

The engine rotational speed sensor 31 is associated with the crankshaft 5, and measures the rotational speed Ne of the engine 1.

The fuel injection volume sensor 32 is associated with the rack 13, measures the position q of the rack 13, measures the volume of injected fuel Q, and determines the power output of the engine 1.

The exhaust gas temperature sensor 33, which is associated with the exhaust pipe 23 between the cylinder 3*a* of the engine 1 and the turbine 20*b*, measures the temperature Tex of the exhaust gas discharged from the engine 1, and determines the presence or absence of an abnormality in the engine 1 by a calculation, described infra.

The atmospheric pressure sensor 34 and the atmospheric temperature sensor 35 are provided on the side 17*b* of the governor case 17 which is opposite to the side 17*a* housing the spring 16, and measure the atmospheric pressure Ttp and the atmospheric temperature Ttm, respectively. The positioning of the atmospheric pressure sensor 34 and the atmospheric temperature sensor 35 is not limited to these positions, and these sensors can be located in other areas of the engine 1 as long as they are in contact with the atmospheric air.

The blowby gas pressure sensor 38 is provided on the crankcase 3 of the engine body 2 and measures the blowby gas pressure Bex of the engine 1.

The engine rotational speed sensor 31, the fuel injection volume sensor 32, and various other sensors 33 to 38 (specific operating variable detection sensors 33 to 38) are connected to the control unit 45, and their respective measurement signals are inputted to the control unit 45.

The control unit 45 is provided with storing means 45*a*, by which the values of the rotational speed and the volume of injected fuel, each at the rated power point, are stored in memory; exhaust gas temperature selection means 45*b*, by which values of the rotational speed Ne from the engine rotational speed sensor 31 and the fuel injection volume Q signal from the fuel injection volume sensor 32 are stored in memory for each of the measurement points in time within a first predetermined period of time, and also, by which the measured exhaust gas temperature signals Tex for each of the points in time are received from the exhaust gas temperature sensor 33 and the highest of these measured exhaust gas temperature values is selected; an exhaust gas temperature conversion means 45*c*, by which the highest measured exhaust gas temperature value is converted to a corrected exhaust gas temperature value at the rated power point; and an alarm output display means 46, by which an alarm is outputted if the corrected exhaust gas temperature value is higher than the corresponding threshold value.

In addition to the storing means 45*a*, there are provided blowby gas pressure selection means 45*d*, by which blowby gas pressure signals Bex are received from the blowby gas pressure sensor 38 during the first predetermined period of time, and the highest blowby gas pressure signal Bex of those measured during the first predetermined period of time is selected; blowby gas pressure conversion means 45*e*, by which the highest measured blowby gas pressure value is converted to a corrected blowby gas pressure value at the rated power point; and an alarm output display means 46, by which an alarm is outputted if the corrected blowby gas pressure signal is higher than the corresponding threshold value.

At this point, the exhaust gas temperature selection means 45*b* would measure the exhaust gas temperature at uniform time intervals, compare the exhaust gas temperature value from the previous measurement to that of the subsequent measurement, and leave in memory only the higher of these exhaust gas temperature values. Similarly, at this point, the blowby gas pressure selection means 45*d* would measure the blowby gas pressure at uniform time intervals, compare the blowby gas pressure value from the previous measurement to that from the subsequent measurement, and leave in memory only the higher of these blowby gas pressure values.

In order to facilitate a description of the storing means 45*a*, the storing means 45*a* has been described as storing the rotational speed and the volume of injected fuel at the rated power point of the engine 1. However, the storing action of the storing means 45*a* is not limited to the rated power point of the engine 1, and can take place at a point in close proximity to the rated power point, or at a point at which the maximum torque is outputted. Each of the rated power point, a point in close proximity to the rated power point, and a point at which the maximum torque is outputted, is hereafter referred to as an "equivalent rated power point".

Next, the engine 1 exhaust gas temperature detecting means relating to the first embodiment is described with reference to the flowchart shown in FIG. 2.

At step 1, the first (earlier) measurement is made at a first point in time, in which the rotational speed Nel is measured by the engine rotational speed sensor 31, the volume of injected fuel Q1 is measured by the fuel injection volume sensor 32, the exhaust gas temperature Tex1 is measured by the exhaust gas temperature sensor 33, and the respective signals are outputted to the control unit 45.

At step 2, the control unit 45, along with calculating the output torque Ft1 of the engine 1 from the values of the rotational speed Nel and the volume of injected fuel Q1, stores in memory the value of the thus calculated output torque Ft1 and the value of the exhaust gas temperature Tex1 at that point in time.

At step 3, at a given time interval tn following the first measurement, a second (subsequent) measurement is made at a second point in time, in which the rotational speed Ne2, the volume of injected fuel Q2, and the exhaust gas temperature Tex2 of the engine 1 are measured, and the respective signals are outputted to the control unit 45.

At step 4, the control unit 45, along with calculating the output torque Ft2 of the engine 1 from the values of the rotational speed Ne2 and the volume of injected fuel Q2, compares the exhaust gas temperature value Tex2 from the second measurement to the exhaust gas temperature value Tex1 from the first measurement, and stores in memory the higher of the two exhaust gas temperature values and the corresponding calculated engine output torque value (for example, the exhaust gas temperature value Tex2 from the second measurement and the calculated engine output torque value Ft2).

At step 5, a third measurement is made at a third point in time following a given time interval tn after the second measurement, and a comparison is made of the exhaust gas temperature value Tex3 from the third measurement and whichever exhaust gas temperature value Tex was higher from the first and second measurements (for example, the exhaust gas temperature value Tex2 from the second measurement), and the higher of these two exhaust gas temperature values and the associated calculated engine output torque value (for example, the exhaust gas temperature value Tex2 from the second measurement and the engine output torque value Ft2) are stored in memory. These measurements and comparisons are carried out for a plurality of points in time within the first predetermined period of time (for example, two hours), and the highest exhaust gas temperature value Texm from that period of time is stored in memory along with the corresponding calculated engine output torque value Ftm.

Figure 3:
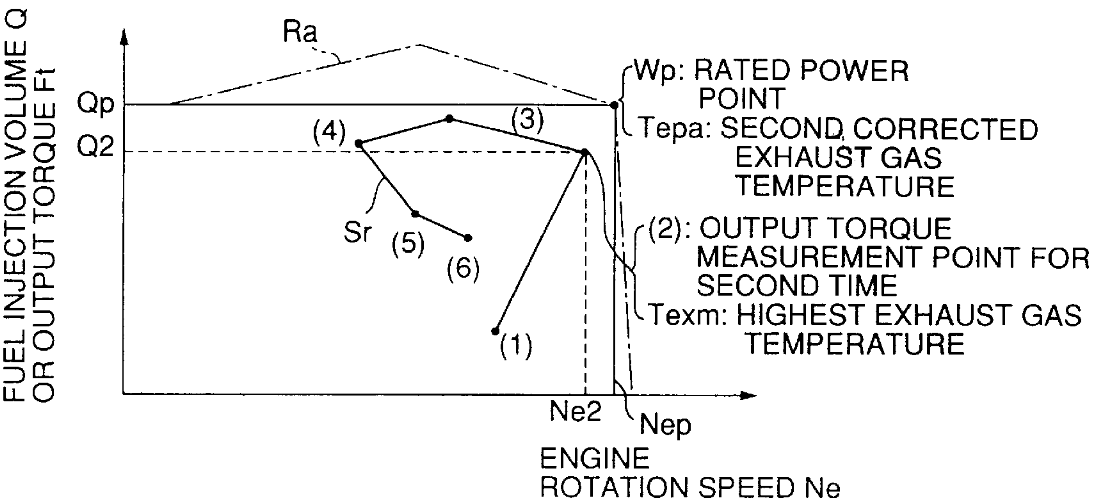
FIG. 3 is a graph illustrating the direction of changes taking place in the volume of injected fuel or in the output torque in relation to the rotational speed of the engine, in accordance with the first embodiment of the invention.

FIG. 3 indicates the direction of changes taking place in the output torque Ft of the engine 1 during operation, with the horizontal axis representing the rotational speed Ne of the engine 1, and the vertical axis representing the fuel injection volume Q or the output torque Ft of the engine 1. The line Ra, consisting of alternating long and short dashes, indicates the output torque curve of the engine 1, with the rated power point being indicated as the point Wp on that line. The solid line Sr indicates the direction of changes taking place in the output torque Ft of the engine 1 during operation, where (1) indicates the output torque measurement point for the first measurement, and (2) indicates the output torque measurement point for the second measurement. In the example shown in FIG. 3, the exhaust gas temperature value Tex2 at the output torque measurement point (2) from the second measurement is indicated to be the highest exhaust gas temperature value Texm.

At step 6, the control unit 45 corrects the highest exhaust gas temperature value Texm within the first predetermined period of time (for example, two hours) to the corrected exhaust gas temperature value Tep at the rotational speed Nep and the fuel injection volume Qp for the rated power point Wp, based on the rotational speed of the engine 1 at the time the measurement was taken. The correction of the exhaust gas temperature value Tep (hereafter referred to as the "first corrected exhaust gas temperature Tep") is carried out in detail, based on a map determined through experimentation and stored in the control unit 45.

Figure 4:
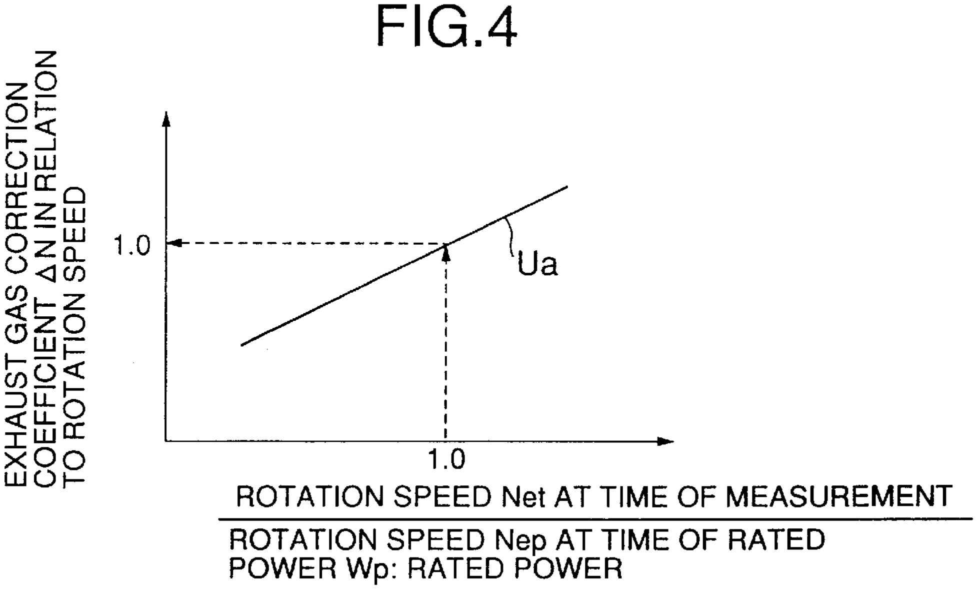
FIG. 4 is a graph illustrating the relation of the exhaust gas correction coefficient to the ratio of the value of the engine rotational speed at the time of measurement to the value of the engine rotational speed at the time of the rated output.

The map, as shown in FIG. 4, determines the first corrected exhaust gas temperature value Tep by taking the ratio of the engine rotational speed value Net at the time of measurement to the engine rotational speed value Nep at the rated power output as the horizontal axis, and the exhaust gas temperature correction coefficient ΔN in relation to the engine rotational speed as the vertical axis, and determining the exhaust gas temperature correction coefficient ΔN in relation to the engine rotational speed from the ratio of the rotational speeds and the equivalent line Ua in the drawing, using the following formula:

$$Tep=\Delta N\times Texm.$$

At step 7, the first corrected exhaust gas temperature Tep is further corrected, based on the output torque of the engine 1 at the time that the measurement was taken, to become the exhaust gas temperature Tepa at the rated power point Wp. The correction of the exhaust gas temperature value Tepa (hereafter referred to as the "second corrected exhaust gas temperature value Tepa") is carried out in detail, based on a map determined through experimentation and stored in the control unit 45.

Figure 5:
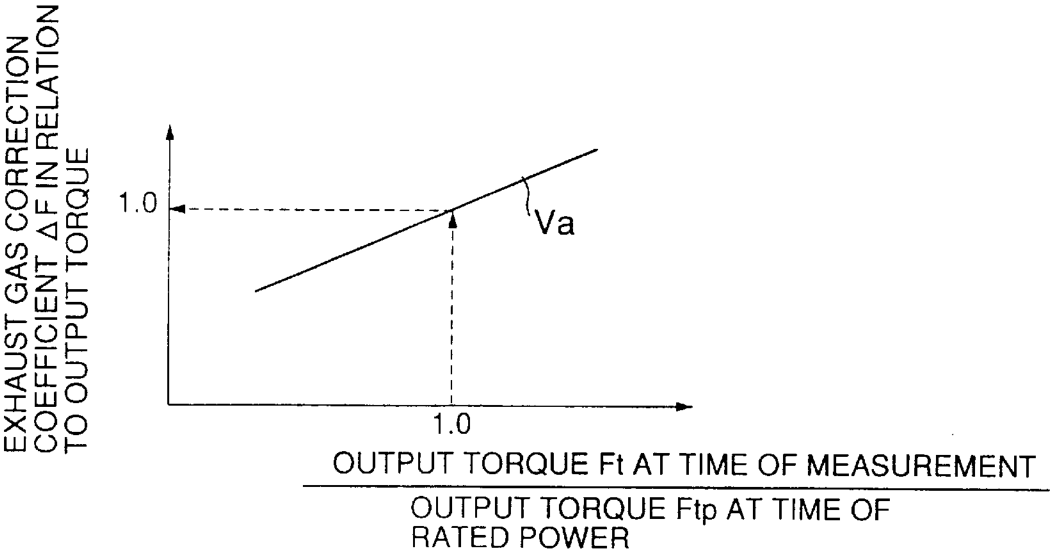
FIG. 5 is a graph illustrating the relation of the exhaust gas correction coefficient to the ratio of the value of the engine output torque at the time of measurement to the value of the engine output torque at the time of the rated output.

The map, as shown in FIG. 5, determines the second corrected exhaust gas temperature value Tepa by taking the ratio of the output torque value Ft at the time of measurement to the output torque value Ftp at the rated power as the horizontal axis, and the exhaust gas correction coefficient ΔF in relation to the output torque as the vertical axis, and determining the exhaust gas correction coefficient ΔF in relation to the output torque from the ratio of the output torques and the equivalent line Va in the drawing, using the following formula:

$$Tepa=\Delta F\times Tep.$$

At step 8, a decision is made as to whether or not the second corrected exhaust gas temperature value Tepa is lower than the corresponding threshold value TEXH (Tepa<TEXH). Alternatively, the second corrected exhaust gas temperature value Tepa determined in the earlier (first) measurement is compared to the second corrected exhaust gas temperature value Tepa determined in the subsequent (second) measurement, and a decision is made as to whether or not the difference between these temperatures is greater than a specified value (for example, 50° C., or more). At step 8, if the second corrected exhaust gas temperature value Tepa is lower than the corresponding threshold value TEXH (YES), the processing proceeds to step 9.

At step 9, the second corrected exhaust gas temperature value Tepa is stored in memory. After the value Tepa has been stored in memory, the processing returns to step 1, and measurement continues for the second stage first predetermined period of time (two hours). The second corrected exhaust gas temperature value Tepa for the two hour period of the second stage, like that of the first stage (earlier) measurement, is also stored in memory if it is lower than the corresponding threshold value TEXH. After the Tepa value has been stored in memory, the processing returns to step 1 and continues through step 9. The measurement carried out during the first predetermined period of time is carried out for n stages (for example, 10 stages), and when the first predetermined period of time × n stages (for example, two hours× 10 stages=20 hours) has elapsed, the processing advances to step 10. At step 8, if the second corrected exhaust gas temperature value Tepa is higher than the corresponding threshold value TEXH (NO), the processing proceeds to step 12.

At step 10, the second corrected exhaust gas temperature values Tepa from the first predetermined periods of time of the various stages are added, and the average value Tepav (hereafter referred to as the "second corrected exhaust gas average temperature value Tepav") for the second corrected exhaust gas temperature values Tepa during that total period of time (20 hours) is determined and stored in memory. The sequence of measurement, correction, and averaging is repeated, with the second corrected exhaust gas average temperature values Tepav being juxtaposed in a time-based sequence (Tepav1, Tepav2, . . . ) and stored in memory. The tendency toward an abnormality in the engine 1 can be judged by considering the ratio at which these second corrected exhaust gas average temperature values Tepav, juxtaposed in a time-based sequence, increase.

Figure 6:
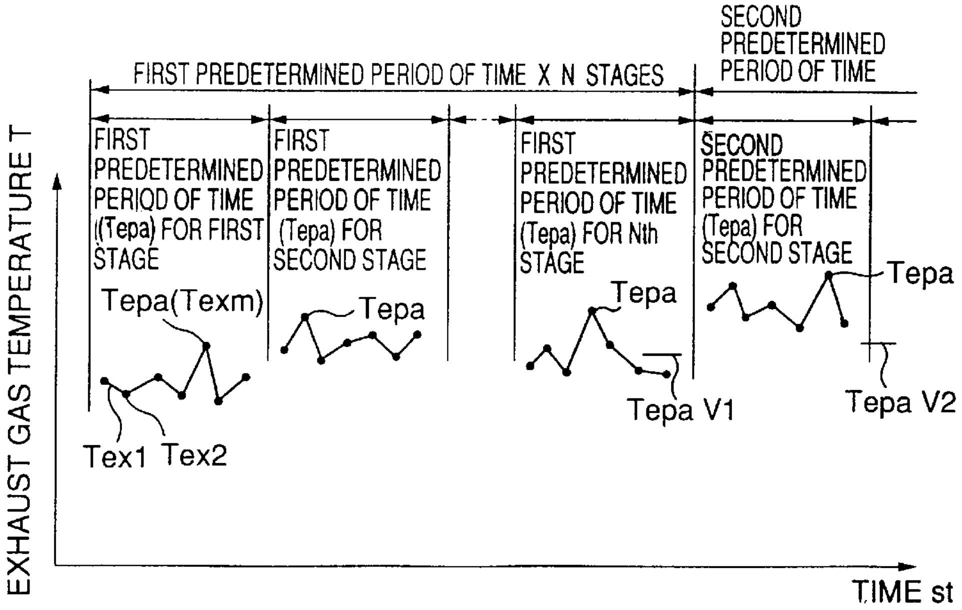
FIG. 6 is a graph illustrating the direction of changes taking place in the exhaust gas temperature of the engine relating to the first embodiment.

FIG. 6 indicates the direction of changes taking place in the exhaust gas temperature of the engine 1 while operating, with the horizontal axis representing the time st and the vertical axis representing the exhaust gas temperature T. First, as shown at the left side of FIG. 6, the highest exhaust gas temperature value Texm of the various exhaust gas temperature values Tex measured during the first predetermined period of time (two hours) of the first stage is selected, and this exhaust gas temperature value Texm is matched to the rated power point Wp and corrected to determine the second corrected exhaust gas temperature value Tepa, and that value is stored in memory. Selection of the first predetermined period of time and the correction of the highest value is repeated for n stages, so that n values of the second corrected exhaust gas temperature Tepa are obtained. These n values of the second corrected exhaust gas temperature Tepa are averaged, and the second corrected exhaust gas average temperature value Tepav is determined for the first predetermined periods of time, and that value is stored in memory.

At step 11, the difference between the second corrected exhaust gas average temperature value Tepav1 from the earlier measurement and the second corrected exhaust gas average temperature value Tepav2 from the subsequent measurement is determined, and a judgment is made as to whether or not that temperature difference exceeds a specified value (for example, 50° C., or more).

At step 11, if the temperature difference exceeds the specified value (YES), the processing returns to step 1. If the temperature difference is lower than the specified value (NO), the processing advances to step 12.

At step 12, a judgment is made that there is an abnormality in the engine 1, and an alarm signal is outputted to the display unit 46 or to a warning horn device or a similar device.

Figure 2:
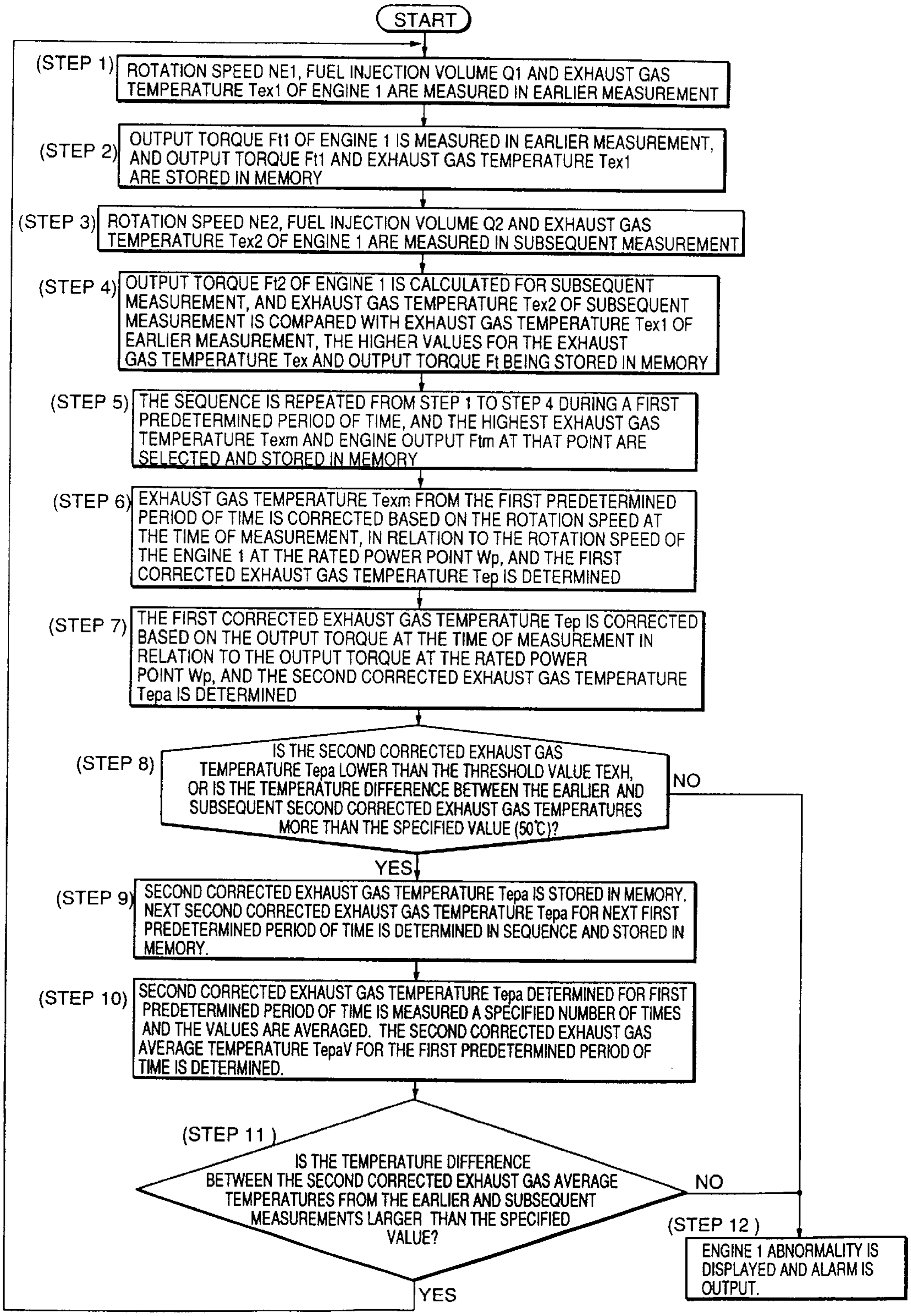
FIG. 2 is a flowchart of a detection method relating to a first embodiment of the present invention, by which an abnormality of the engine exhaust gas temperature is detected.

Instead of the sequence of steps illustrated in FIG. 2, an alternative sequence has step 6 and step 7 reversed.

Also, when the values measured at step 6 and step 7 are corrected in accordance with the rated power point Wp, the following corrections can also be implemented in response to the atmospheric pressure and the atmospheric temperature.

Namely, when the exhaust gas temperature value Tex is measured at step 1, the atmospheric pressure Ttp and the atmospheric temperature Ttm are also measured by the atmospheric pressure sensor 34 and the atmospheric temperature sensor 35, respectively. At step 7, a positive correlation is formed in that "the higher the atmospheric pressure value Ttp, the higher the exhaust gas temperature value Tex will be", and the second corrected exhaust gas temperature value Tepa is correlated with the atmospheric pressure value Ttp and corrected using the map determined through experimentation and shown in FIG. 7.

Figure 7:
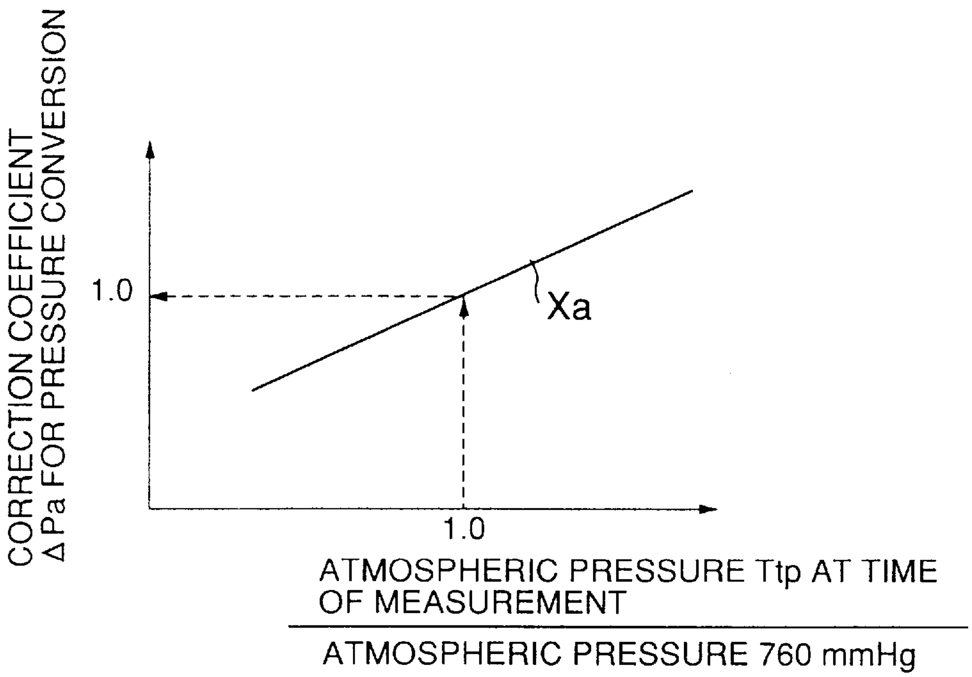
FIG. 7 is a graph illustrating the relation of the pressure conversion correction coefficient to the ratio of the atmospheric pressure value at the time of measurement to an atmospheric pressure of 760 mmHg.

Using the ratio of the atmospheric pressure value Ttp to the atmospheric pressure of 760 mmHg, measured on the horizontal axis of FIG. 7, the correction coefficient ΔPa for the pressure conversion represented by the vertical axis is taken, and the third corrected exhaust gas temperature value Tepb is determined by determining the correction coefficient ΔPa for pressure conversion from the atmospheric pressure ratio and the equivalent line Xa in the drawing, and using the following formula:

$$Tepb = \Delta Pa \times Tepa.$$

Figure 8:
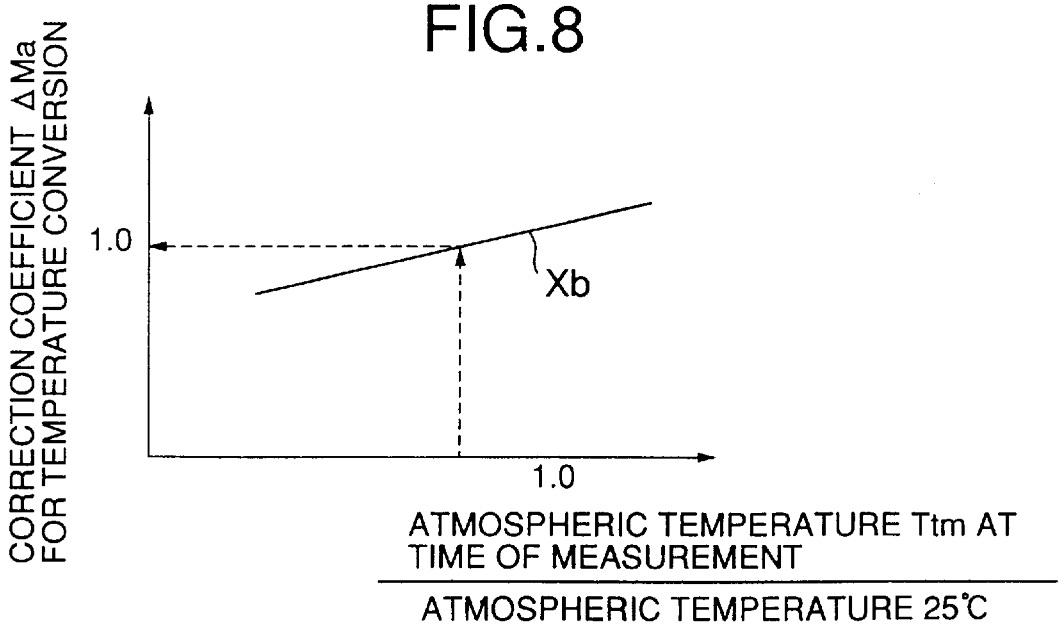
FIG. 8 is a graph illustrating the relation of the temperature conversion correction coefficient to the ratio of the atmospheric temperature at the time of measurement to an atmospheric temperature of 25° C.

Furthermore, at step 7, a positive correlation is formed in that "the higher the atmospheric temperature value Ttm, the higher the exhaust gas temperature value Tex will be", and the third corrected exhaust gas temperature value Tepb is corrected to correspond to the atmospheric temperature Ttm, using the map determined through experimentation and shown in FIG. 8.

Using the ratio of the atmospheric temperature value Ttm to the atmospheric temperature of 25° C., measured on the horizontal axis of FIG. 8, t he correction coefficient ΔMa f or the temperature conversion represented by the vertical axis is taken, and the fourth corrected exhaust gas temperature value Tepc is determined by determining the correction coefficient ΔMa for temperature conversion from the atmospheric temperature ratio and the equivalent line Xb in the drawing, and using the following formula:

$$Tepc = \Delta Ma \times Tepb.$$

If this fourth corrected exhaust gas temperature value Tepc is substituted for the second corrected exhaust gas temperature value Tepa of step 8 when judgments subsequent to step 8 are made, more accurate judgments can be made.

Figure 9:
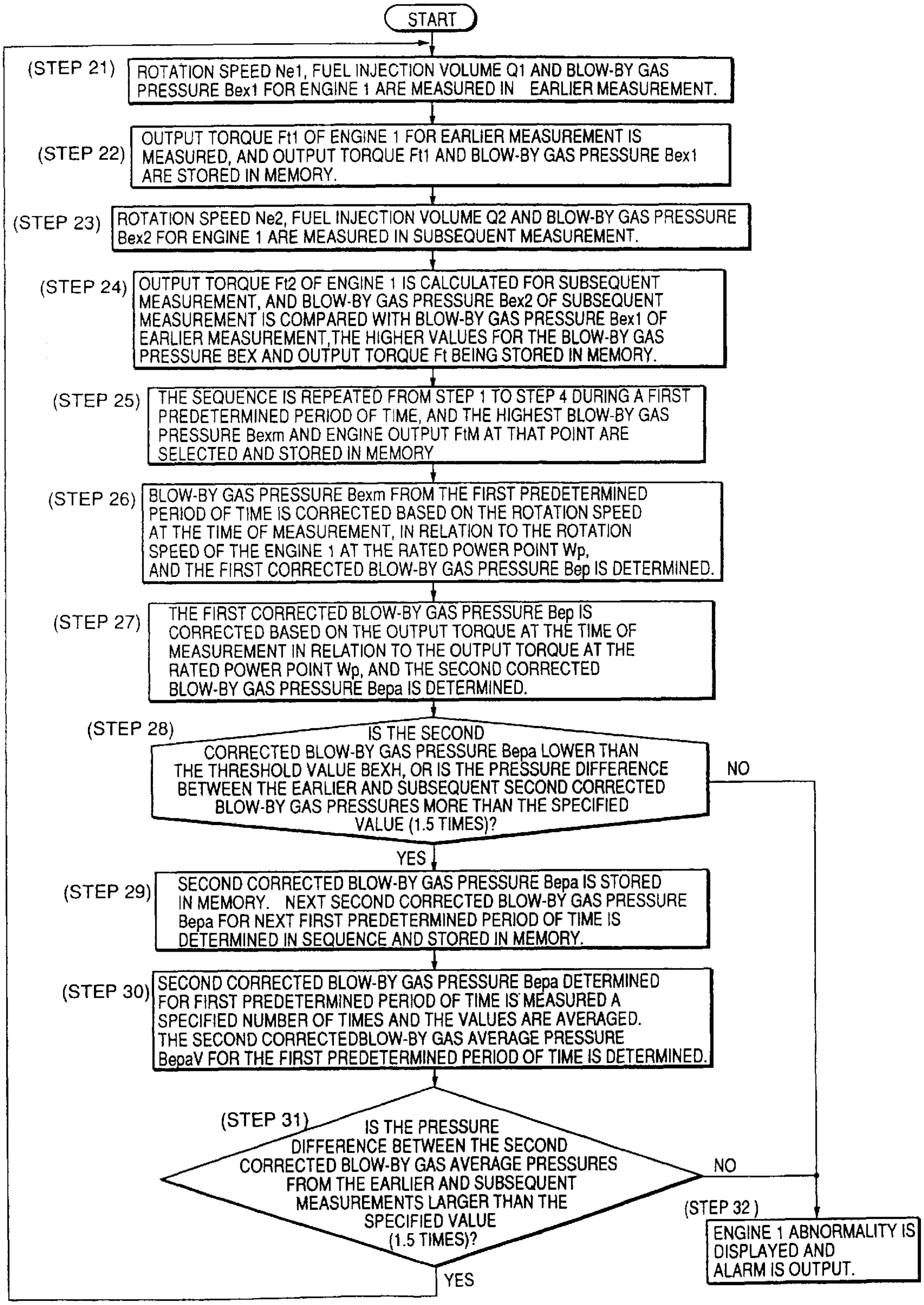
FIG. 9 is a flowchart showing the method by which an abnormality of the blowby gas pressure in the engine is detected in accordance with the second embodiment of the present invention.

Next, the blowby gas pressure detecting means relating to the second embodiment is described in reference to the flowchart shown in FIG. 9.

At step 21, the first (earlier) measurement is made, in which the rotational speed Ne1 is measured by the engine rotational speed sensor 31, the volume of injected fuel Q1 is measured by the fuel injection volume sensor 32, the blowby gas pressure Bex1 is measured by the blowby gas pressure sensor 38, and the respective signals are outputted to the control unit 45.

At step 22, the control unit 45, along with calculating the output torque value Ft1 of the engine 1 from the value of the rotational speed Nel and the value of the volume of injected fuel Q1, stores in memory the calculated output torque value Ft1 and the blowby gas pressure value Bex1 at that point in time.

At step 23, at a given time interval tn following the first measurement, a second (subsequent) measurement is made at a second point in time, in which the rotational speed Ne2, the volume of injected fuel Q2, and the blowby gas pressure Bex2 are measured, and the respective signals are outputted to the control unit 45.

At step 24, the control unit 45, along with calculating the output torque value Ft2 of the engine 1 from the value of the rotational speed Ne2 and the value of the volume of injected fuel Q2, compares the blowby gas pressure value Bex2 from the second measurement to the blowby gas pressure value Bex1 from the first measurement, and stores in memory the higher of the two blowby gas pressure values and the corresponding engine output torque value (for example, the blowby gas pressure value Bex2 from the second measurement and the engine output torque value Ft2).

At step 25, a third measurement is made at a third point in time following a given time interval tn after the second measurement, and a comparison is made of the blowby gas pressure value Bex3 from the third measurement and whichever blowby gas pressure value Bex was higher from the first and second measurements (for example, the blowby gas pressure value Bex2 from the second measurement), and the higher of the two blowby gas pressure values and the associated engine output torque value (for example, the blowby gas pressure value Bex2 from the second measurement and the engine output torque value Ft2) are stored in memory. These measurements and comparisons are carried out for a plurality of points in time within the first predetermined period of time (for example, two hours), and the highest blowby gas pressure value Bexm from that period of time is stored in memory along with the engine output torque value Ftm at that point in time.

At step 26, the control unit 45 corrects, based on the rotational speed of the engine 1 at the time the measurement was taken, the highest blowby gas pressure value Bexm measured within the first predetermined period of time (for example, two hours) to the corrected blowby gas pressure value Bep at the rotational speed Nep and the fuel injection volume Qp for the rated power point Wp. The correction of the blowby gas pressure value Bep (hereafter referred to as the "first corrected exhaust gas pressure value Bep") is carried out in detail, based on a map determined through experimentation and stored in the control unit 45.

Figure 10:
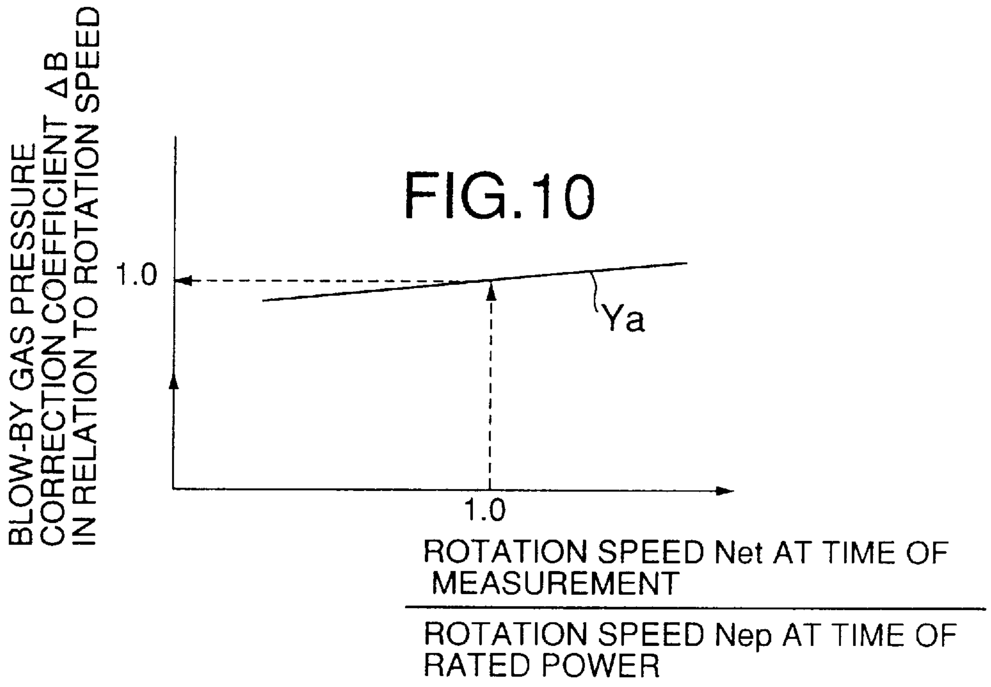
FIG. 10 is a graph illustrating the relation of the correction coefficient for the blowby gas pressure to the ratio of the value of the engine rotational speed at the time of measurement to the value of the engine rotational speed at the rated power output.

The map, as shown in FIG. 10, determines the first corrected blowby gas pressure value Bep by taking the ratio of the value of the rotational speed Net at the time of measurement to the value of the rotational speed Nep at the rated power output as the horizontal axis, and the blowby gas pressure correction coefficient ΔB in relation to the rotational speed as the vertical axis, and determining the blowby gas pressure correction coefficient ΔB in relation to the rotational speed from the ratio of the rotational speeds and the equivalent line Ya in the drawing, using the following formula:

$$Bep=\Delta B\times Bexm.$$

At step 27, the first corrected blowby gas pressure value Bep is further corrected, based on the value of the output torque of the engine 1 at the point in time at which that blowby gas pressure measurement was taken, to become the blowby gas pressure value Bepa at the rated power point Wp. The correction of the blowby gas pressure value Bepa (hereafter referred to as the "second corrected blowby gas pressure value Bepa") is carried out in detail, based on a map determined through experimentation and stored in the control unit 45.

Figure 11:
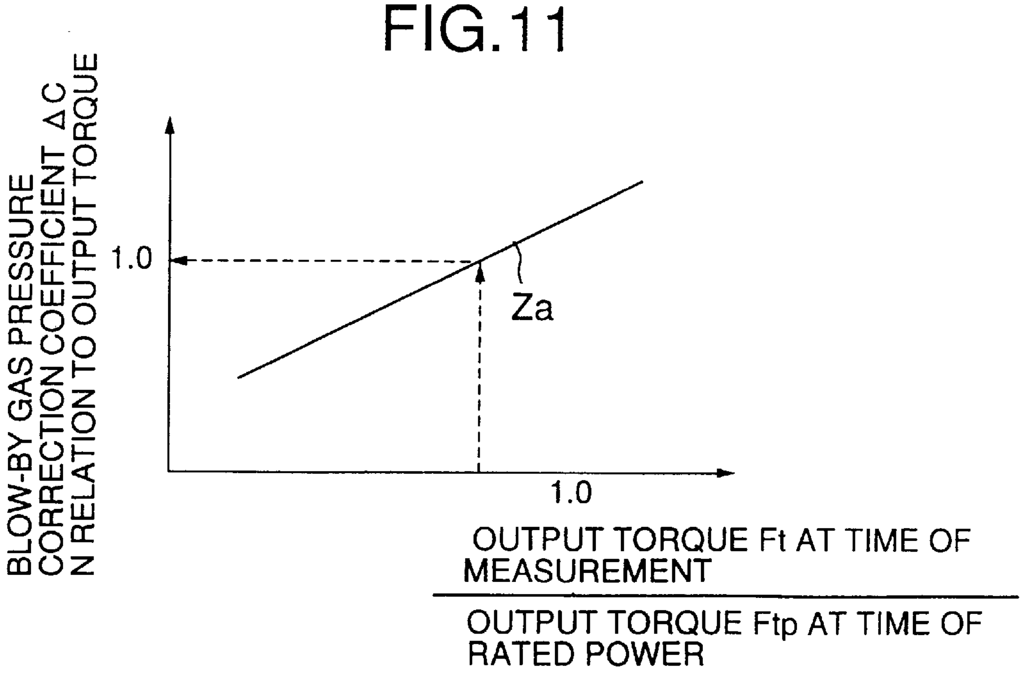
FIG. 11 is a graph illustrating the relation of the correction coefficient for the blowby gas pressure to the ratio of the value of the engine output torque at the time of measurement to the value of the engine output torque at the rated power output.

The map, for example, as shown in FIG. 11, determines the second corrected blowby gas pressure value Bepa by taking the output torque value Ft at the time of measurement in relation to the output torque value Ftp at the rated power as the horizontal axis, and the blowby gas pressure correction coefficient AC in relation to the output torque as the vertical axis, and determining the blowby gas pressure correction coefficient AC in relation to the output torque from the ratio of the output torques and the equivalent line Za in the drawing, using the following formula:

$$Bepa=\Delta C\times Bep.$$

At step 28, a decision is made as to whether or not the second corrected blowby gas pressure value Bepa is lower than the corresponding threshold value BEXH (Bepa<BEXH). Alternatively, the second corrected blowby gas pressure value Bepa determined in the earlier measurement is compared to the second corrected blowby gas pressure value Bepa determined in the subsequent measurement, and a decision is made as to whether or not a ratio of the pressures is greater than a specified value (for example, 1.5 times, or more).

At step 28, if the second corrected blowby gas pressure value Bepa is lower than the corresponding threshold value BEXH (YES), the processing proceeds to step 29.

At step 29, the second corrected blowby gas pressure value Bepa is stored in memory. After the Bepa value has been stored in memory, the processing returns to step 21 and the measurement continues for the second stage first predetermined period of time (two hours). The second corrected blowby gas pressure Bepa for the two hour period of the second (subsequent) stage, like that of the first stage (earlier) measurement, is also stored in memory if lower than the corresponding threshold value BEXH. After the Bepa value has been stored in memory, the processing returns to step 21 and continues through step 29. The measurements carried out during the first predetermined periods of time are carried out for n stages (for example, 10 stages), and when the first predetermined period of time×n stages (for example, two hours× 10 stages=20 hours) has elapsed, the processing advances to step 30. At step 28, if the second corrected blowby gas pressure value Bepa is higher than the corresponding threshold value BEXH (NO), the processing proceeds to step 32.

At step 30, the second corrected blowby gas pressure values Bepa from the first predetermined periods of time of the various stages are added, and the average value Bepav (hereafter referred to as the "second corrected blowby gas average pressure value Bepav") for the second corrected blowby gas pressure values Bepa measured during that total period of time (20 hours) is determined and stored in memory. The sequence of measurement, correction, and averaging is repeated, with the second corrected blowby gas average pressure values Bepav being juxtaposed in a time-based sequence (Bepav1, Bepav2, . . . ) and stored in memory. The tendency toward the abnormality in the engine 1 can be judged by considering the ratio at which these second corrected blowby gas average pressure values Bepav, juxtaposed in a time-based sequence, increase.

At step 31, the average pressure ratio of the second corrected blowby gas average pressure value Bepav1 from the previous measurement to the second corrected blowby gas average pressure value Bepav2 from the subsequent measurement is determined, and a judgment is made as to whether or not that average pressure ratio exceeds a specified value (for example, 1.5 times, or more).

At step 31, if the average pressure ratio exceeds the specified value (YES), the processing returns to step 21. If the average pressure ratio is lower than the specified value (NO), the processing advances to step 32.

At step 32, a judgment is made that there is an abnormality in the engine 1, and an alarm signal is outputted to the display unit 46 or to a warning horn or similar device.

Instead of the sequence of steps illustrated in FIG. 9, an alternative sequence has step 26 and step 27 reversed.

While the invention has been illustrated in FIG. 6 in terms of n stages of first predetermined periods of time followed by n stages of second predetermined periods of time, the invention is broadly applicable to measurements in a first period of time followed by measurements in a second period of time, regardless of whether these periods of time are stages, with each stage being a predetermined period of time, or are themselves considered to be predetermined periods of time.

The control unit 45 in the first and second embodiments, along with calculating the output torque Ft of the engine 1 from the value of the rotational speed Ne and the value of the volume of injected fuel Q, is designed to store in memory the calculated engine output torque value Ft1 at that point in time, as well as the exhaust gas temperature value Tex1 or the blowby gas pressure value Bex1. It can also be used to store in memory the value of the engine rotational speed Ne, the value of the volume of injected fuel Q, and the exhaust gas temperature value Tex1 or the blowby gas pressure value Bex1, and to read from the memory the values for the rotational speed Ne, the volume of injected fuel Q, and the exhaust gas temperature Tex1 or the blowby gas pressure Bex1 close to the rated power point Wp.

Also, the first and second embodiments of the present invention have been described using the exhaust gas temperature Tex, or the blowby gas pressure Bex, from the exhaust system; but instead of these, the present invention can naturally be used for early detection of: breakdowns in the hydraulic system, using the oil pressure or the oil temperature of the lubrication oil; breakdowns in the intake system such as a clogged filter or an intake valve problem, using the intake air pressure; breakdowns in the fuel system, such as in the fuel pump, using the fuel supply pressure; and breakdowns in the cooling system, using the cooling water temperature. The oil pressure, the oil temperature, the intake air pressure, the fuel supply pressure, the cooling water temperature, and other operating variables of the engine 1 can be used as the specific operating variables.

Reasonable variations and modifications of the invention are within the scope of the foregoing description and the appended claims to the invention.

That which is claimed is:

1. An engine abnormality detection apparatus which measures specific data from at least one system for an engine and which detects abnormality in a respective system, said apparatus comprising:

a memory for storing a value of an engine rotational speed and a value of a fuel injection volume at an equivalent rated power point;

a detection sensor for measuring a specific operating variable of a system of said engine;

an engine rotational speed sensor for measuring an engine rotational speed;

a fuel injection volume sensor for measuring a volume of injected fuel;

storing and selection means for storing in a memory a rotational speed value from said engine rotational speed sensor and a fuel injection volume value from said fuel injection volume sensor at each of a plurality of points in time during a first period of time, for inputting a measured value of said specific operating variable at each of said plurality of points in time from said detection sensor, and for selecting a largest value of the inputted measured values; and conversion means for correcting said largest value to become a corrected value of the specific operating variable for the values of the engine rotational speed and the fuel injection volume at the equivalent rated power point, and for storing the corrected value in memory.

2. An engine abnormality detection apparatus in accordance with claim 1, further comprising an alarm means for outputting an alarm if the corrected value is larger than a corresponding threshold value.

3. An engine abnormality detection apparatus in accordance with claim 1 wherein said storing and selection means determines a first corrected value at the equivalent rated power point by selecting the largest value within said first period of time, stores in a memory a rotational speed value from said engine rotational speed sensor and a fuel injection volume value from said fuel injection volume sensor at each of a plurality of points in time during a second period of time, inputs from said detection sensor a measured value of said specific operating variable at each of the plurality of points in time during said second period of time, selects a largest value of the measured values inputted during said second period of time, and selects and stores the larger of the largest value from said first period of time and the largest value from said second period of time.

4. An engine abnormality detection apparatus in accordance with claim 3 wherein upon selecting and storing the larger of the largest values, said storing and selection means deletes the smaller of the largest values.

5. An engine abnormality detection apparatus in accordance with claim 3, further comprising an alarm output means for outputting an alarm if either a corrected value is larger than a corresponding threshold value or a larger of the largest values is larger than a corresponding threshold value.

6. An engine abnormality detection device for measuring an engine exhaust gas temperature to detect an abnormality in an engine system, said apparatus comprising:

an exhaust gas temperature sensor, that detects a temperature of exhaust gas from an engine;

an engine rotational speed sensor, that measures a rotational speed of the engine;

a fuel injection volume sensor, that measures a volume of injected fuel to the engine;

storing means for storing in memory a value of an engine rotational speed and a value of fuel injection volume at an equivalent rated power point;

exhaust gas temperature selection means for storing in memory a value of rotational speed from said engine rotational speed sensor and a value of fuel injection volume from said fuel injection volume sensor at each of a plurality of points in time during a first period of time, for measuring an engine exhaust gas temperature at each of said plurality of points in time, and for selecting a largest value of measured engine exhaust gas temperature from among thus measured engine exhaust gas temperatures;

exhaust gas temperature conversion means for correcting said largest value of measured engine exhaust gas temperature to a corrected exhaust gas temperature value for the engine rotational speed and the fuel injection volume at the equivalent rated power point, and for storing the corrected exhaust gas temperature value in memory; and alarm output means for outputting an alarm if the corrected exhaust gas temperature value at the equivalent rated power point is larger than a corresponding threshold value.

7. An engine abnormality detection apparatus in accordance with claim 6, wherein said storing means stores a value of engine rotational speed and a value of the volume of injected fuel at the rated power point and an atmospheric pressure of 760 mmHg and an atmospheric temperature of 25° C.; said apparatus further comprising:

an atmospheric pressure sensor for detecting atmospheric pressure;

an atmospheric temperature sensor for detecting atmospheric temperature; and atmospheric conversion means for converting said corrected exhaust gas temperature value to a further corrected exhaust gas temperature value at the equivalent rated power point, an atmospheric pressure of 760 mmHg, and an atmospheric temperature of 25° C.; and wherein said alarm output means outputs an alarm if said further corrected exhaust gas temperature value is larger than a corresponding threshold value.

8. An engine abnormality detection apparatus for measuring an engine blowby gas pressure to detect an abnormality in components of an engine, said apparatus comprising:

a blowby gas pressure sensor for measuring a blowby gas pressure of the engine;

an engine rotational speed sensor for measuring a rotational speed of the engine;

a fuel injection volume sensor for measuring a volume of injected fuel;

storing means for storing in memory a value of engine rotational speed and a value of fuel injection volume at an equivalent rated power point;

blowby gas pressure selecting means for selecting a largest blowby gas pressure value from values of the blowby gas pressure measured by said blowby gas pressure sensor at a plurality of points in time within a first period of time;

blowby gas pressure conversion means for converting said largest blowby gas pressure value to become a corrected blowby gas pressure value for the engine rotational speed and the fuel injection volume at the equivalent rated power point, and for storing the corrected blowby gas pressure value in memory; and alarm means for outputting an alarm if the corrected blowby gas pressure value is larger than a corresponding threshold value.

9. A method for ascertaining an abnormality in a system related to an engine, said method comprising the steps of:

measuring a value of a specific operating variable of said engine at each of a plurality of points in time during a first period of time;

measuring a value of an engine rotational speed of said engine at each of said plurality of points in time during said first period of time;

measuring a value of a fuel injection volume for said engine at each of said plurality of points in time during said first period of time;

storing in a memory each thus measured engine rotational speed value and each thus measured fuel injection volume value;

selecting a largest value of the measured values of the specific operating variable during said first period of time; and converting said largest value to become a corrected value of the specific operating variable at the equivalent rated power point; and storing the corrected value in memory.

10. A method in accordance with claim 9, further comprising the step of storing a value of an engine rotational speed and a value of a fuel injection volume at an equivalent rated power point; and wherein said step of converting comprises converting said largest value, based on the thus stored measured engine rotational speed value which was measured at a point in time at which said largest value was measured, the thus stored measured fuel injection volume value which was measured at the point in time at which said largest value was measured, the thus stored value of the engine rotational speed at the equivalent rated power point, and the thus stored value of the fuel injection volume at the equivalent rated power point, to become a corrected value of the specific operating variable for the equivalent rated power point.

11. A method in accordance with claim 9, further comprising the step of outputting an alarm if the corrected value is larger than a corresponding threshold value.

12. A method in accordance with claim 9, further comprising the steps of:

measuring a value of the specific operating variable of said engine at each of a plurality of points in time during a second period of time;

measuring a value of an engine rotational speed of said engine at each of said plurality of points in time during said second period of time;

measuring a value of a fuel injection volume for said engine at each of said plurality of points in time during said second period of time;

storing in a memory each thus measured engine rotational speed value and each thus measured fuel injection volume value which were measured during said second period of time;

selecting a largest value of the measured values of the specific operating variable during said second period of time;

converting said largest value for said second period of time to become a corrected value of the specific operating variable at the equivalent rated power point;

selecting a larger value of the corrected value for said first period of time and the corrected value for said second period of time; and storing the larger value in memory.

13. A method in accordance with claim 12, further comprising the step of outputting an alarm if the larger value is larger than a corresponding threshold value.

14. A method in accordance with claim 9, wherein the step of selecting a largest value comprises:

storing in memory a measured value of the specific operating variable measured at an earlier point in time during said first period of time;

storing in memory a measured value of the specific operating variable measured at a subsequent point in time during said first period of time;

selecting a larger value of (a) the measured value of the specific operating variable measured at the earlier point in time during said first period of time and (b) the measured value of the specific operating variable measured at the subsequent point in time during said first period of time;

storing in a memory the thus selected larger value of the measured values of the specific operating variable; and deleting from memory a smaller of the measured values of the specific operating variable.

15. A method in accordance with claim 9, wherein said specific operating variable is an engine exhaust gas temperature.

16. A method for ascertaining an abnormality in a system related to an engine, said method comprising the steps of:

measuring a value of an engine exhaust gas temperature at each of a plurality of points in time within a first period of time;

selecting a highest measured value of exhaust gas temperature from among the values measured within said first period of time;

converting said highest measured value of exhaust gas temperature to a corrected exhaust gas temperature value at an equivalent rated power point; and issuing an alarm if said corrected exhaust gas temperature value is higher than a corresponding threshold value.

17. A method in accordance with claim 16 wherein said step of converting comprises:

storing in memory a value of engine rotational speed at the equivalent rated power point and a value of fuel injection volume at the equivalent rated power point; and converting said highest measured value of exhaust gas temperature to the corrected exhaust gas temperature value based on the stored value of engine rotational speed at the equivalent rated power point and the stored value of fuel injection volume at the equivalent rated power point.

18. An engine abnormality detection method which measures a blowby gas pressure of an engine to detect an abnormality in engine pistons, piston rings and other components of the engine, said method comprising the steps of:

storing in memory a value of an engine rotational speed and a value of a fuel injection volume;

measuring a value of the blowby gas pressure of the engine at each of a plurality of points in time during a first period of time; and selecting a largest value of the values of the blowby gas pressure from among those measured during said first period of time; and issuing an alarm if said largest value is higher than a corresponding threshold value.

* * * * *